2. Sheets. Sheet-1.

F. Morandi.

Lantern.

No. 2861

Reissued Feb. 11, 1868.

2 Sheets Sheet 2.

F. Morandi.

Lantern.

No 2861 Reissued Feb. 11, 1868.

UNITED STATES PATENT OFFICE.

FRANCIS MORANDI, OF BOSTON, MASSACHUSETTS.

IMPROVEMENT IN LANTERNS.

Specification forming part of Letters Patent No. 14,201, dated February 5, 1856; Reissue No. 2,861, dated February 11, 1868.

*To all whom it may concern:*

Be it known that I, FRANCIS MORANDI, of Boston, in the county of Suffolk and State of Massachusetts, have invented a new and Improved Lantern for the purpose of lighting street gas-lamps, of which the following is a full, clear, and exact description, reference being had to the accompanying drawings, making part of this specification, in which—

Figure 1:
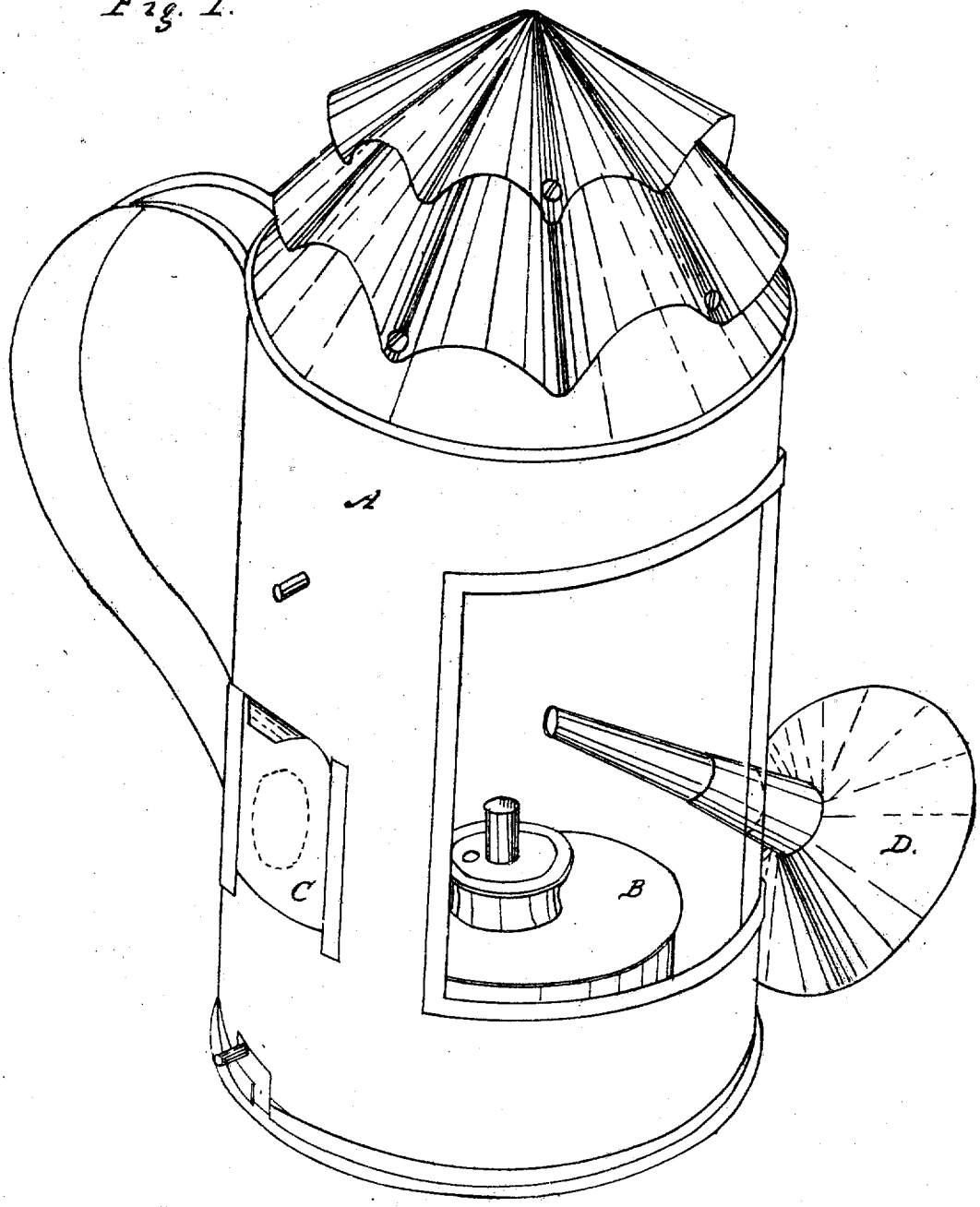
Figure 2:
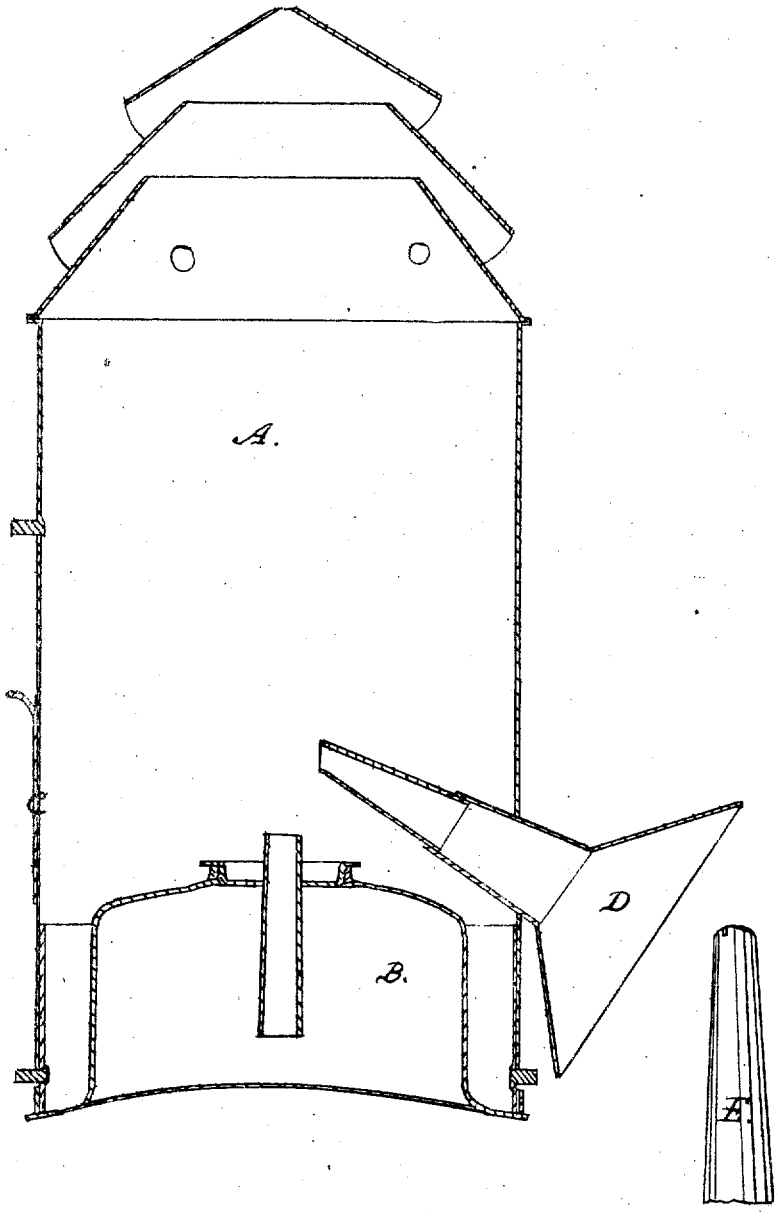

Figure 1 is a perspective view; Fig. 2, a vertical section through the same.

Similar letters of reference indicate corresponding parts.

The object of my present invention is the production of a lantern for general purposes, but more especially for the purpose of lighting street gas-lamps without the necessity of opening the lantern or the delay attendant upon the use of a torch, which requires to be lighted and extinguished at every lamp.

In the accompanying drawings, A is the body of the lantern; B, the lamp; C, a slide covering an opening through which the lamp may be trimmed. Upon one side of the lantern I introduce a funnel, D, the smaller end of which just reaches the flame of the lamp.

When in use, the lantern is placed at the side of the gas-burner E, and, the cock being turned, a portion of the gas emitted becomes mixed with atmospheric air, and is instantly drawn through the funnel into the lantern, where it is at once ignited, a slight explosion of the mixed gas and air taking place, the flame of which passes back to the burner through the funnel.

With this lantern street gas-lamps may be lighted in far less time than has heretofore been required, a lamp-lighter being enabled by its use to tend a much larger number of lamps than by the methods of lighting now in use.

Having thus described my invention, what I claim as my invention, and desire to secure by Letters Patent, is—

The funnel D, applied to the lantern in the manner and for the purpose substantially as herein set forth.

F. MORANDI.

Witnesses:
R. CLARK,
A. BALLOU.